E. C. BERNHEIM.
EYEGLASSES.
APPLICATION FILED OCT. 30, 1912.
1,094,969.
Patented Apr. 28, 1914.
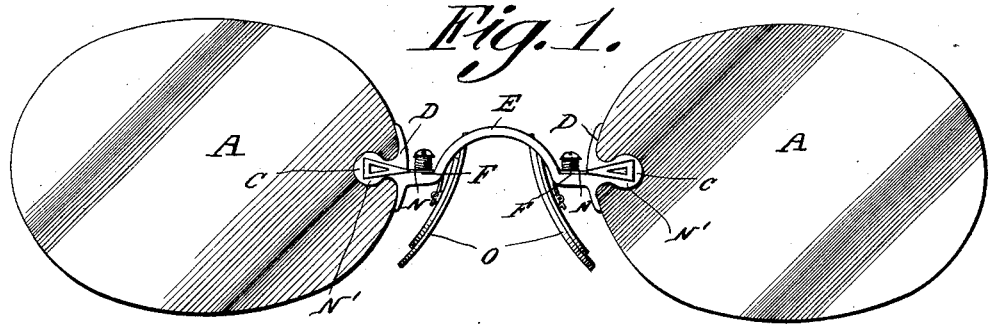
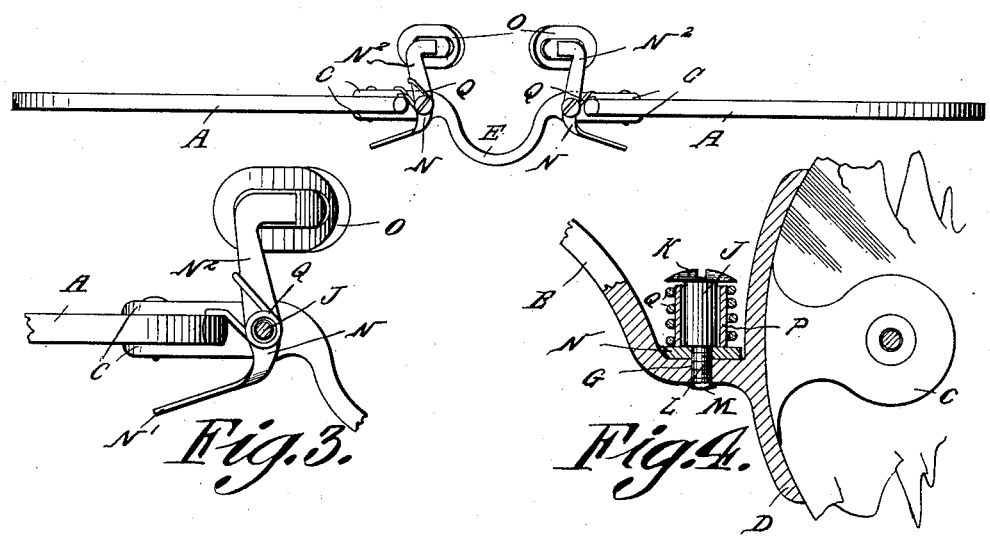
Eugene C. Bernheim,
Inventor,

UNITED STATES PATENT OFFICE.

EUGENE C. BERNHEIM, OF SOUTHBRIDGE, MASSACHUSETTS.

EYEGLASSES.

1,094,969.  Specification of Letters Patent.  Patented Apr. 28, 1914.

Application filed October 30, 1912. Serial No. 728,555.

*To all whom it may concern:*

Be it known that I, EUGENE C. BERNHEIM, a citizen of the United States, residing at Southbridge, in the county of Worcester and State of Massachusetts, have invented certain new and useful Improvements in Eyeglasses, of which the following is a specification.

My invention relates to improvements in eyeglasses, and refers particularly to the character or type of eyeglasses which employ finger operated spring actuated levers which carry the guards for retaining the eyeglasses upon the nose of the wearer.

One object of my invention is the provision of a sleeve or roller bearing for the spring which actuates the levers, such roller bearing being designed to overcome the most serious defect at present found in eyeglasses of this type, namely, the continual wear and breakage of the springs.

Another object of my invention is the provision of a roller bearing forming the support for the coils of the springs, said bearing permitting a free and proper movement of the coils of the springs and thereby insuring a soft and easy action to the springs, while preserving elasticity or tension, also preventing wear upon the springs, and thereby greatly increasing the life and utility of the springs.

In the present style of finger operating eyeglasses wherein the usual round torsion acting coil springs are employed the pressure of the finger in operating the finger lever which operates the coil spring, causes each coil to wind around a stationary post or pivot screw, and a further object of my invention is the provision of a roller bearing for this pivot screw so that the tension of the spring as above described will clutch on the roller bearing, which bearing revolves on said stationary pivot screw, and by this means the friction on the spring coils is very greatly reduced by the absorption of the friction by the sleeve or roller bearing.

Another object of my invention is the provision of a roller bearing mounting for the springs which in addition to greatly enhancing the efficiency and practicability of the eyeglass as well as obtaining the consequent saving, will be of compact, simple, and ornamental construction, and will not in the least disfigure the external appearance of the eyeglass.

With the attainment of these objects in view, my invention, broadly stated, consists in the combination with the mounting, levers, and springs, of a roller or sleeve bearing upon which the coils of the spring are mounted.

The invention further consists of an eyeglass embodying novel features of construction and combination of parts, substantially as disclosed herein.

In order that the detailed construction and the operation of my invention may be fully understood and the advantages resulting from such construction be fully appreciated, I have illustrated in the accompanying drawings an embodiment of my invention, it being understood that I reserve the right to make any alterations or modifications in such construction as fall within the breadth of my claims.

Figure 1 represents a front elevation of a pair of eyeglasses equipped with my improvements. Fig. 2 represents a plan view thereof. Fig. 3 represents a plan view of one half of the mounting and one lever and spring, the stud or support being shown in section. Fig. 4 represents a sectional view on line 4—4 of Fig. 2, and Fig. 5 represents a view of one of the coil springs, the sleeve or roller bearing, and the post or support, for the purpose of showing their construction in detail.

Referring by letter to the drawings, in which similar letters of reference denote corresponding parts in all the views of the drawings:—The letter A designates the lenses, to which are secured by means of screws B the ears C, formed with the curved straps D, which rest against the inner edges of the lenses, and the straps are connected by the bow or bridge spring E, the bow spring being formed adjacent the straps with the broadened portion or platform F, which platforms are disposed in a horizontal plane and are provided with vertical openings G, which are provided with a determined number of screw threads H, the purpose of which will presently appear. Mounted in said vertical openings are the studs or posts J, having the kerfed heads K at their upper ends and near their lower portions formed with the double annular shoulder K' to provide the reduced portions K² to fit the corresponding annular recesses in the platforms. The lower of said reduced portions K² of said screws is provided with a series of screw threads L to engage the threads of the openings, and said studs are swaged as at M to secure the posts in position and to provide a smooth, neat joint. Upon the posts and resting upon the platforms of the nose spring are the horizontal portions N of the levers, having the outer vertically disposed finger engaging portions N' and the inner arms N² upon which are mounted the guards or gripping members O. Also loosely surrounding the studs and located between the heads thereof and the central portions of the levers are the sleeves P, which are free of contact with the levers and studs and are thus permitted a rotation upon the studs forming a roller bearing, around which are located the coils Q of the springs, which have their upper ends Q' bearing against the straps and their lower ends Q² bearing against the guard carrying ends of the levers, the springs thus exerting their tension against the levers and forcing the guards or gripping members into proper engagement with the nose.

From the foregoing description, taken in connection with the drawings, the operation of my improvement will be understood, and it will be apparent that pressure upon the finger portions of the levers opens the guard carrying ends of said levers and permits the application of the eyeglasses to the nose, as is usual in eyeglasses of this type or character, and it will be noted that my novel form of bearing for the coils of the springs avoids all friction, strain, and wear upon the coils by reason of the rotation of the sleeve under the action of the coils, and that this roller bearing will add a long life to the coils and prove a great saving, also will give a soft and easy action to the coils without decreasing the elasticity thereof, and that from every point of view my improvements will prove practical, efficient, and desirable.

I claim:—

1. In an eyeglass, the combination of the lenses, the bridge or bow spring and the finger levers mounted upon the bow spring, springs supported upon the bow spring for actuating said levers, and roller bearings upon which said springs are mounted.

2. In an eyeglass, the combination of the lenses, the bow spring connecting the lenses, studs mounted upon the bow spring, levers mounted upon said studs, roller bearings mounted upon the studs, and springs for actuating the levers having their body portions mounted upon said roller bearings.

3. In an eyeglass, the combination of the bridge connection, supports rigidly carried by the bridge connection, and formed with heads at their upper ends and threaded portions at their lower ends to engage the bridge connections, levers pivoted upon said supports, springs for actuating said levers, and roller bearings upon which the said springs are mounted.

4. In an eyeglass, the combination of the lenses, the bow spring connecting the lenses, studs secured to said bow spring having a head at one end and their other ends secured in said bow spring, levers pivoted upon said studs, sleeves or roller bearings disposed on the studs between the levers and the heads of the studs, and springs coiled around said sleeves and having one end engaging the levers and the other end engaging a portion of the bow spring.

5. In an eyeglass, the combination with the lenses, the bow spring connecting the lenses and formed with the straps and the platform portions, the studs rising from said platforms, the levers pivoted upon said studs, the roller or sleeve bearings mounted on said studs, and the springs coiled around said sleeves or roller bearings with their ends engaging the straps and levers said studs being arranged to retain the levers, sleeve bearings and springs in proper relation.

6. In an eyeglass, the combination with the mounting supports carried by said mounting and consisting of studs having a head at one end and having the other end reduced and engaging the mounting, finger operated levers carrying gripping members pivoted upon said supports, coil springs having their ends engaging the mounting and levers, and a roller bearing upon which the coils of said springs are mounted.

7. In an eyeglass, the combination of lenses, mounting, studs or supports rising from said mounting, finger operated levers pivoted upon said studs, roller bearings encircling the studs, and springs engaging the levers and mounting and having their body portions surrounding said roller bearings.

8. In an eyeglass, the combination of the lenses, the mounting therefor, the studs or supports formed with a head at one end and having their other end provided with screw threads to engage threaded openings of the mounting to make said supports rigid in said mounting, levers pivoted upon the studs and carrying guards at one end, and finger engaging portions at the other end, sleeves rotatably mounted on said studs to provide roller bearings, and springs coiled upon said studs and having one of their ends engaging the levers and their other ends engaging the mounting.

9. In an eyeglass, the combination with the spring actuated levers carrying gripping members, of roller bearings for the springs of said levers, said bearings consisting of studs or supports and sleeves rotatably mounted on said studs or supports.

10. In an eyeglass, the combination of the lenses, bridge connection, finger levers pivoted upon the bridge connection, springs having one end engaging the levers and their other end engaging the bridge connection, and rotatable bearings for the body of said springs.

11. An eyeglass mounting having, in combination with a fixed portion comprising a pivot, a nose clamp lever mounted on the fixed portion and embracing the pivot, a spring supporting sleeve freely rotatable upon the pivot, and a spring coiled around said sleeve and engaging at its ends respectively, the fixed portion and the nose clamp lever.

In testimony whereof I affix my signature in presence of two witnesses.

EUGENE C. BERNHEIM.

Witnesses:
DANIEL P. BERNHEIM,
JOHN W. BAILEY.

Copies of this patent may be obtained for five cents each, by addressing the "Commissioner of Patents, Washington, D. C."